(12) United States Patent
Haas et al.

(10) Patent No.: US 12,031,691 B1
(45) Date of Patent: Jul. 9, 2024

(54) LIGHT MODULE FOR MOTOR VEHICLE LIGHT AND METHOD FOR OPERATING SUCH LIGHT MODULE

(71) Applicant: ZKW Group GmbH, Wieselburg (AT)

(72) Inventors: Erik Haas, Rabenstein an der Pielach (AT); Clemens Aigner, St. Pölten (AT); Stefan Miedler, Unterradlberg (AT); Jeong Jiyoung, Gyeonggi-do (KR); Hyung Joo Kang, Seoul (KR); Sungdu Kwon, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/397,347

(22) Filed: Dec. 27, 2023

(30) Foreign Application Priority Data

Dec. 28, 2022 (EP) .................................... 22216978

(51) Int. Cl.
*F21S 41/60* (2018.01)
*B60Q 1/14* (2006.01)

(52) U.S. Cl.
CPC ............ *F21S 41/60* (2018.01); *B60Q 1/1415* (2013.01); *B60Q 2300/40* (2013.01)

(58) Field of Classification Search
CPC .... F21S 41/60; B60Q 1/1415; B60Q 2300/40
See application file for complete search history.

(56) References Cited

U.S. PATENT DOCUMENTS

| 10,596,956 | B1 | 3/2020 | Ahn et al. | |
|---|---|---|---|---|
| 11,761,604 | B2 * | 9/2023 | Larimian | F21S 41/153 362/545 |
| 2014/0022068 | A1 * | 1/2014 | Usami | G06V 20/56 340/436 |
| 2018/0170241 | A1 * | 6/2018 | Mizuno | F21S 41/663 |
| 2020/0363707 | A1 | 11/2020 | Hirakura | |

FOREIGN PATENT DOCUMENTS

DE         102016223227 A1    5/2018

OTHER PUBLICATIONS

Extended European Search Report for European Patent Application No. 22216978.1 dated Jun. 19, 2023 (10 Pages).
(Continued)

*Primary Examiner* — Anne M Hines
(74) *Attorney, Agent, or Firm* — Eversheds Sutherland (US) LLP (57) ABSTRACT

Light module for a motor vehicle light including a light source, projection unit, deflection unit, and control unit. The light source is designed to receive a light control signal (LCS) and emit spatially modulated light (SML) as a function of the LCS. The projection unit is designed to project the SML emitted by the light source within a projection angular range (PAR) in front of the light module. The deflection unit is designed to receive a deflection control signal (DCS) and manipulate the SML emitted by the light source as a function of the DCS such that the projection of the SML emitted by the light source can be displaced in front of the light module with a displacement angle within the PAR. The control unit is designed to receive and evaluate an input signal and to transmit the LCS to the light source based on said evaluation.

14 Claims, 4 Drawing Sheets

(56) References Cited

OTHER PUBLICATIONS

Gründhofer, et al., "Recent Advances in Projection Mapping Algorithms, Hardware and Applications", Computer Graphics Forum: Journal of the European Association for Computer Graphics, 37(2): 653-675, 2018.

Sing, et al., "Super Resolution Projection: Leveraging the MEMS Speed to Double or Quadruple the Resolution", SPIE Proceedings, Mar. 4, 2019.

* cited by examiner

LIGHT MODULE FOR MOTOR VEHICLE LIGHT AND METHOD FOR OPERATING SUCH LIGHT MODULE

CROSS-REFERENCE TO RELATED APPLICATIONS

This application claims priority to European Patent Application No. 22216978.1, filed Dec. 28, 2022, which is incorporated herein by reference.

FIELD OF THE INVENTION AND DESCRIPTION OF PRIOR ART

The invention relates to a light module for a motor vehicle light comprising a light source, a projection unit, a deflection unit, as well as a control unit, wherein the light source is designed to receive a light control signal and to emit spatially modulated light as a function of the light control signal, wherein the projection unit is designed to project the spatially modulated light emitted by the light source within a projection angular range in front of the light module, wherein the deflection unit is designed to receive a deflection control signal and to manipulate the spatially modulated light emitted by the light source as a function of the deflection control signal such that the projection of the spatially modulated light emitted by the light source can be displaced in front of the light module with a displacement angle within the projection angular range.

The invention further relates to a motor vehicle.

The invention also relates to a method for operating a light module for a motor vehicle light, wherein the light module comprises a light source, a projection unit, a deflection unit, as well as a control unit, wherein the light source is designed to receive a light control signal and to emit spatially modulated light as a function of the light control signal, wherein the projection unit is designed to project the spatially modulated light emitted by the light source within a projection angular range in front of the light module, wherein the deflection unit is designed to receive a deflection control signal and to manipulate the spatially modulated light emitted by the light source as a function of the deflection control signal such that the projection of the spatially modulated light emitted by the light source can be displaced in front of the light module with a displacement angle within the projection angular range.

Current light modules or lighting systems, particularly in the field of motor vehicle lights, increasingly require the option to generate a light image that can be adapted to specific requirements in a highly adaptive manner. In order to create such light modules, lighting systems that project or generate a segmented light image or a spatially modulated light have first and foremost become known. The light image generated can thus be adapted depending on specific requirements. Such requirements may relate to the driving situation. It is thus advantageous for driving safety reasons when light modules for motor vehicle lights illuminate the region in front of the motor vehicle lights in such a way as to provide optimum illumination for the driver without dazzling other road users. Furthermore, such light modules are intended to serve as visual indicators for drivers or other road users. The aforementioned requirements can therefore relate to the presentation of information for the driver of the vehicle or to the presentation of information for other road users. These visual indicators comprise, for example, a wide variety of symbols, which can be generated and displayed.

To further increase the freedom in the adaptation of the segmented light image or the spatially modulated light image, deflection units have become known, which also manipulate the emitted spatially modulated light such that the resulting light image can be displaced.

The illuminable area can be expanded by displacing the generated light image. The number of light segments of a projected spatially modulated light can be virtually increased, in particular with a sufficiently fast and oscillating displacement.

Although this provides more freedom in the adaptation of the generated light image, the complexity of such light modules increases greatly. At the same time, such light modules, in particular such light modules for motor vehicle lights, should be as cost-effective and robust as possible in their control. A compact and temporally stable form of control of a light source and deflection unit is not currently known.

SUMMARY OF THE INVENTION

It is an object of the invention to provide a light module for a motor vehicle light, comprising the aforementioned elements, which meets the above requirements.

The object of the invention is achieved with a light module of the type stated above, in which the control unit is designed to receive and evaluate an input signal and on the basis of this to transmit the light control signal to the light source, wherein the input signal comprises a first light data block, which is at least partially representative of the emitted spatially modulated light from the light source in a first time range and first deflection data are contained in this first light data block, which are representative of a first displacement angle in the same first time range, with which the projection of the spatially modulated light emitted by the light source can be displaced in front of the light module within the projection angular range in the first time range.

By coupling the deflection data in the corresponding light data block, the spatially modulated light and a displacement angle of the projection of the spatially modulated light within the projection angular range can be linked to each other at substantially any time. This subsequently enables simple and synchronous control of the light source and deflection unit.

The displacement angle is measured by the displacement in relation to a neutral position of the projection of the spatially modulated light emitted by the light source within the projection angular range, wherein the displacement angle is 0° in this neutral position. The displacement angle is preferably smaller than the largest angular displacement of a projection of an individual light segment of the spatially modulated light. The displacement angle can particularly preferably be between −2° and +2°.

The projection angular range is determined by the aperture of the projection unit. The projection angular range therefore corresponds to the maximum possible projection cone of the projection unit. Such a projection cone refers to a cone in the mathematical sense, wherein all sub-variants can also be included. Examples of sub-variants include pyramid cones or truncated cones. A "displacement of the projection within the projection angular range" therefore means the displacement of the projection in the possible projection cone, i.e. in the angular space resulting from the projection unit. The projection angular range preferably has its largest extension in the horizontal plane and preferably covers a horizontal angular range of at most 50°. The projection angular range has a further extension in the vertical plane and preferably covers a vertical angular range of at most 20°.

Within the scope of the current patent application, the term "unit" alone or in a composition, such as in "projection unit", "deflection unit" or "control unit", does not necessarily mean a single element. The term can also encompass a plurality of elements, assemblies, modules, components or combinations thereof.

Terms such as "have", "contain", "comprise" and "include" can be understood as synonymous with each other.

A "spatially modulated light" is understood to mean a light beam that has at least two light segments in at least one plane perpendicular to the light propagation direction of the light beam that have different light intensities as a function of or based on the light control signal. A wide variety of techniques are already known for generating such a "spatially modulated light". These include in particular spatial modulation by means of LEDs (light-emitting diodes) arranged in a matrix, spatial light modulation by means of an LCD (liquid crystal display), or spatial light modulation by means of DLP (digital light processing) or DMD (digital mirror device). Alternatively, light beam modulation techniques have also become known, i.e. scanning systems that scan light beams or light rays with a frequency that is imperceptible to the human eye onto an area such that freely variable light images are created. Such systems for spatial modulation and light beam modulation are referred to as "light source" for short within the scope of this patent application. Light sources known today already enable spatially modulated light to be emitted with several thousand individually switchable and dimmable light segments. The light source preferably generates spatially modulated light by means of spatial modulation, wherein the spatially modulated light has more than 1000 light segments in at least one plane perpendicular to the light propagation direction of the spatially modulated light.

The term "representative" means that there is a direct connection and that the data mentioned directly describe a specific condition. Alternative terms are therefore "characterizing" or "describing".

It can be particularly advantageous when the control unit is designed to extract a first light control signal and a first deflection control signal from the first light data block from the input signal and to output the first deflection control signal in the first time range to the deflection unit and the first light control signal in the first time range to the light source such that the projection of the spatially modulated light of the light source is displaced by a first displacement angle in the first time range as soon as the spatially modulated light is emitted by the light source in the first time range.

In an alternative embodiment, the control unit is designed to extract a first light control signal and the first deflection data from the first light data block and to integrate the first deflection data into the first light control signal in such a way that part of the emitted spatially modulated light in the first time range contains information about the first displacement angle in the same first time range, wherein the light module further has a light sensor which is designed to pick up the one part of the emitted spatially modulated light of the light source, which contains information about the first displacement angle in the first time range and to output a first deflection control signal based thereon to the deflection unit such that the projection of the spatially modulated light of the light source is displaced by the first displacement angle in the first time range as soon as the spatially modulated light is emitted by the light source in the first time range.

Within the context of the invention, "as soon as" is understood to mean that the spatially modulated light of the light source is emitted substantially in that time range in which the deflection unit can displace the projection of the spatially modulated light of the light source by the associated displacement angle. A person skilled in the art is aware that, in practice, a control system may have to process work steps sequentially and therefore the output of the deflection control signal and the output of the light control signal cannot occur at exactly the same time.

Minimal delays are also possible due to runtime differences or other influences. It is fundamental that the spatially modulated light of the light source, which is represented by part of the light data block, is emitted in that time range in which the projection of the spatially modulated light of the light source would or will be displaced by the displacement angle, wherein the displacement angle is represented by the deflection data in the corresponding light data block.

It can advantageously be provided that the input signal comprises a plurality of consecutive light data blocks each having deflection data, thereby describing a plurality of consecutive time ranges, in which each of the individual light data blocks each having deflection data is representative of the emitted spatially modulated light of the light source and of the displacement angle in the respective time range, wherein the duration of the respective timer ranges is substantially the same and is between 5 ms and 50 ms.

In particular, it can be provided that the input signal is provided by a superordinate control unit, wherein the superordinate control unit is designed to form at least the first light data block and the second light data block each having deflection data from a setpoint image such that the projection of the emitted spatially modulated light of the light source of the first time range overlapping with the projection of the emitted spatially modulated light of the light source of the second time range substantially produces the setpoint image.

It is in particular advantageous when each n-th light data block of the plurality of consecutive light data blocks contains deflection data, which are equal to each other and n is a natural number greater than 1.

"Equal to each other" means in this case that the deflection data that are equal to each other are identical such that they are representative of the same or identical displacement angle of the projection of the spatially modulated light.

In a very compact design, it is advantageous when the spatially modulated light emitted by the light source comprises a plurality of light segments and the first light data block comprises intensity values, which describe the light intensity of at least some of the plurality of light segments in the first time range.

It is particularly efficient when the intensity values respectively have a bit depth of 4 to 32 bits and the first deflection data are integrated in at least one bit of this bit depth.

Alternatively, it can be provided that the first light data block has a plurality of channels and one channel contains the first deflection data.

The first light data block preferably has two, particularly preferably three channels.

In this context, a channel is a data block that is representative of a specific part, in particular a colour component, of at least part of the spatially modulated light.

In one aspect, the invention relates to a motor vehicle having a light module according to one of the preceding claims.

In this aspect, it can be particularly advantageous when the motor vehicle has at least one second light module, which is identical to the first light module and the control unit of the second light module receives the same input signal as the control unit of the first light module and the first light data block further comprises an identification, which can be clearly assigned to the first light module or to the second light module.

The object is also achieved with a method of the type mentioned in the introduction, wherein the method has the following steps:
  a) providing a first light data block which is at least partially representative of the emitted spatially modulated light of the light source in a first time range,
  b) providing first deflection data which are representative of the first displacement angle in the same first time range,
  c) integrating the first deflection data into the first light data block,
  d) transmitting the first light data block together with the integrated first deflection data via an input signal to the control unit,
  e) evaluation of the input signal by the control unit,
  f) providing a first light control signal to the light source in the first time range according to the first light data block,
  g) providing a first deflection control signal to the deflection unit in the same first time range according to the first deflection data integrated in the first light data block.

It can in particular be advantageous when in step e) the control unit extracts a first light control signal and a first deflection control signal from the first light data block and in step f) the control unit outputs the first light control signal in the first time range to the light source and in step g) the control unit outputs the first deflection control signal in the same first time range to the deflection unit such that the projection of the spatially modulated light of the light source is displaced by the first displacement angle in the first time range as soon as the spatially modulated light is emitted by the light source in the first time range.

Alternatively, it can be provided that in step e) the control unit extracts the first light control signal and the first deflection data from the first light data block and before step f) the control unit integrates the first deflection data into the first light control signal in such a way that part of the emitted spatially modulated light in the first time range contains information about the first displacement angle in the same first time range,
  wherein the light module further has a light sensor which is designed before step g) to pick up the at least one part of the emitted spatially modulated light of the light source in the first time range in order then in step g) to output a first deflection control signal based thereon to the deflection unit in the first time range such that the projection of the spatially modulated light of the light source is displaced by the first displacement angle in the first time range as soon as the spatially modulated light is emitted by the light source in the first time range.

BRIEF DESCRIPTION OF THE DRAWINGS

The invention together with further advantages are explained in more detail below based on exemplary embodiments, which are illustrated in drawings. In the drawings

DETAILED DESCRIPTION OF EMBODIMENTS OF THE INVENTION

Exemplary embodiments and the functioning of the invention are now explained in more detail in FIG. 1 to FIG. 7. The figures are shown only by way of example and in simplified form in order to be able to better describe the essential components. A person skilled in the art is aware that embodiments and features of the invention can also be suitably combined. For example, the invention is first and foremost described based on the first light data block and the first deflection data contained therein. However, it is clear that parts of the description, where applicable, can also apply in the same way to a plurality of consecutive light data blocks each containing deflection data.

Figures 1, 2A:
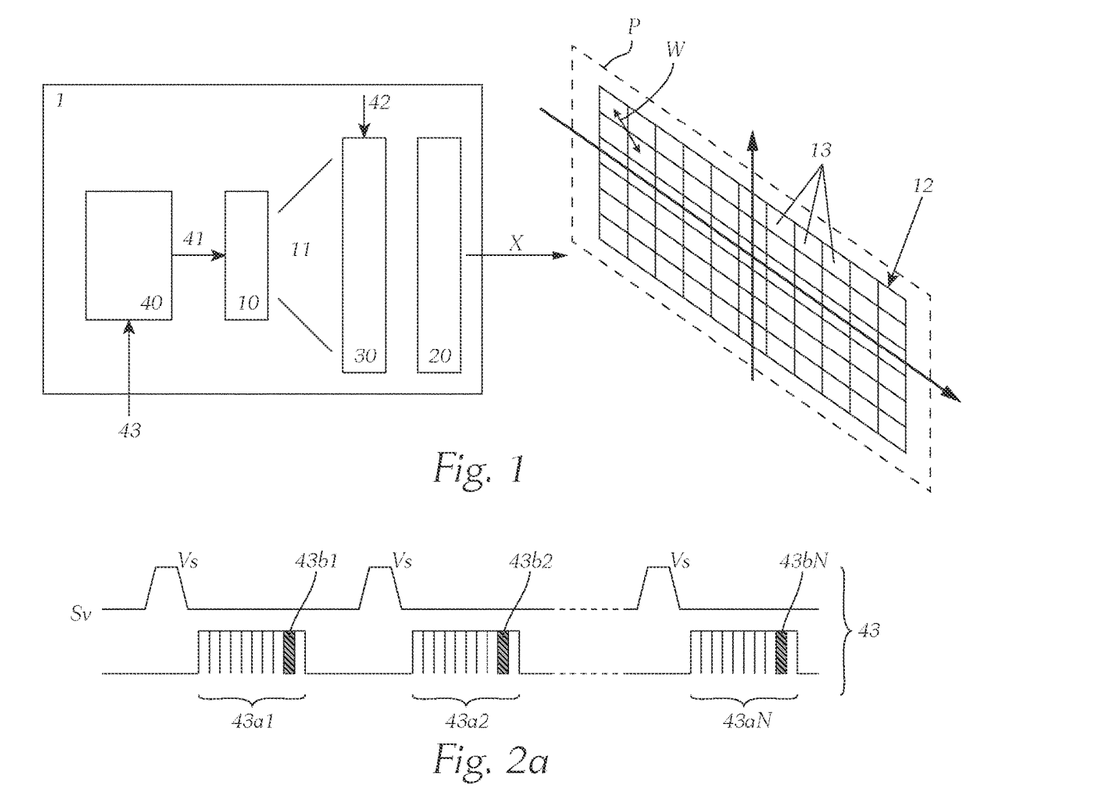
FIG. 1 shows a light module according to the invention.
FIG. 2a to FIG. 2c show embodiments of the input signal according to the invention.

FIG. 1 shows a block diagram of the light module 1 according to the invention together with a perspective view of the projection 12 of the spatially modulated light 11 within the projection angular range P. The light module 1 comprises a light source 10, a projection unit 20, a deflection unit 30, as well as a control unit 40. The light source 10 is designed to receive a light control signal 41 and to emit spatially modulated light 11 as a function of the light control signal 41. The light source 10 can comprise a plurality of elements. For example, the light source 10 comprises a light-emitting element and a downstream spatial modulator, such as an LCD, DMD or DLP in order to subsequently emit a spatially modulated light 11 as a function of the light control signal 41. Optional additional elements such as optical lenses or reflectors between the light source 10 and deflection unit 30 are not shown for the sake of clarity, but can be installed if needed. The light source 10 preferably comprises an array with at least two LEDs (light-emitting diodes), wherein each LED can be individually controlled in order to subsequently emit spatially modulated light 11 as a function of the light control signal 41. Furthermore, the light source 10 can comprise a combination of a light-emitting element, a collimator and a light beam modulator, which scans collimated light of the light-emitting element in a scanning form at a frequency that is imperceptible to the human eye onto an area in order to subsequently emit spatially modulated light 11 as a function of the light control signal 41. The region can comprise a light conversion element.

A person skilled in the art is aware of a wide variety of ways to spatially modulate light. It is fundamental to the invention that a light beam is emitted from the light source 10 as a function of or on the basis of the light control signal 41, which has at least two light segments in at least one plane perpendicular to the light propagation direction of the light beam that have different light intensities.

This spatially modulated light 11 is projected by a projection unit 20 within a projection angular range P in front of the light module 1. A person skilled in the art is aware that projection refers to the imaging of the spatially modulated light 11 in front of the light module in order to form segmented light distribution—i.e. a projection 12 with light segments 13. Such a projection unit 20 usually comprises a plurality of optical elements, in particular lenses. For the sake of clarity, this plurality of optical elements is not shown. In the present case, the projection 12 comprises an array of light segments 13 with 6 rows and 11 columns. The projection 12 preferably corresponds to an image of an LED array, which, as described above, emits spatially modulated light 11. Although only 66 light segments 13 are shown, the light source 10 can be designed in such a way that several thousand light segments 13 are projected within the projection angular range P.

Furthermore, a deflection unit 30 is provided, which is arranged downstream of the light source 11 in the beam path of the emitted spatially modulated light 11. The deflection unit 30 is preferably arranged in the beam path of the emitted spatially modulated light 11 between the light source 10 and at least part of the projection unit 20. At least part of the projection unit 20 means that it can consist of a plurality of optical elements, as explained above, and thus the deflection unit 30 can be arranged between the plurality of optical elements of the projection unit 20. This deflection unit 30 can receive a deflection control signal 42 and manipulate the spatially modulated light 11 emitted by the light source 10 as a function of the deflection control signal 42 such that the projection 12 of the spatially modulated light emitted by the light source can be displaced in front of the light module 1 with a displacement angle W within the projection angular range P.

The deflection unit 30 can comprise a glass plate 31 (shown in FIG. 3b), which consists of a material that is transparent for the emitted spatially modulated light 11 of the light source 10. This glass plate can be designed as a plane-parallel plate and be mounted so as to pivot about at least one pivot access by a corresponding mechanical suspension, wherein this pivot axis is preferably perpendicular to the light propagation direction of the spatially modulated light 11 emitted by the light source 10. For example, the deflection unit 30 can further have an electromagnetic actuator (not shown), which pivots the glass plate about the at least one pivot axis depending on the deflection control signal 42. By pivoting, the angle of entry of the spatially modulated light 11 into the glass plate can be changed, whereby the spatially modulated light 11 can be displaced as the light passes through the glass plate parallel to the light propagation direction of the spatially modulated light 11 in accordance with the refraction, as a result of which ultimately the emitted spatially modulated light 11 can be manipulated as a function of the deflection control signal 42 in such a way that the projection 12 of the spatially modulated light emitted by the light source can be displaced in front of the light module 1 with a displacement angle W within the projection angular range P.

A person skilled in the art will be aware of a wide variety of ways to create a deflection unit 30 that is able to manipulate the spatially modulated light 11 of the light source 10 as a function of the deflection control signal 42 in such a way that the projection 12 of the spatially modulated light 11 emitted by the light source 10 can be displaced in front of the light module 1 with a displacement angle W within the projection angular range P. For example, prisms are also conceivable, which displace the projection of the spatially modulated light emitted by the light source in front of the light module 1 within the projection angular range P by changing the lateral position in relation to the light propagation direction of the spatially modulated light 11 and thus also by refraction. Reflective solutions of a deflection unit 30 are also possible.

It is fundamental to the invention that the deflection unit 30 can displace the projection 12 of the spatially modulated light 11 emitted by the light source in front of the light module 1 within the projection angular range P as a function of or based on the deflection control signal 42.

Figure 3A:
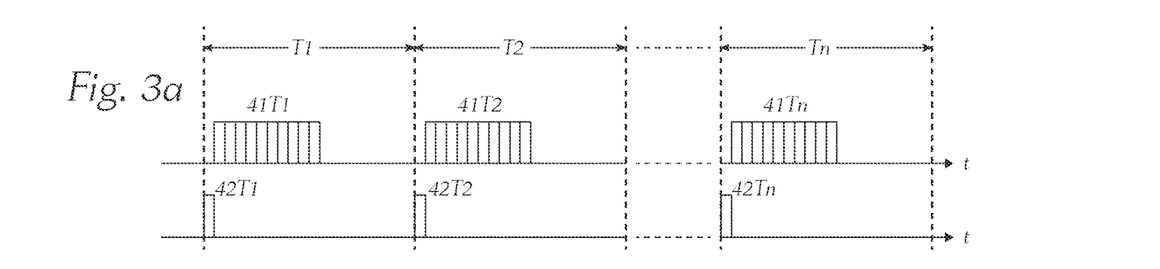
FIG. 3a to FIG. 3d show a temporal relationship.
Figure 3B:
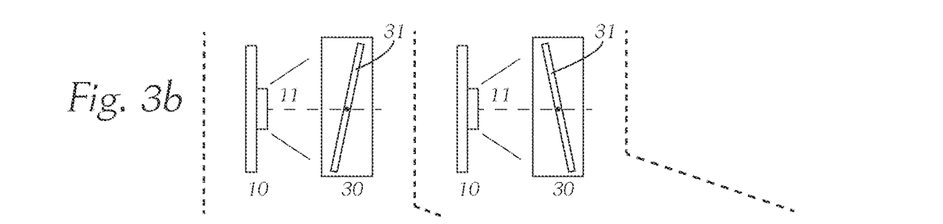
Figure 3C:
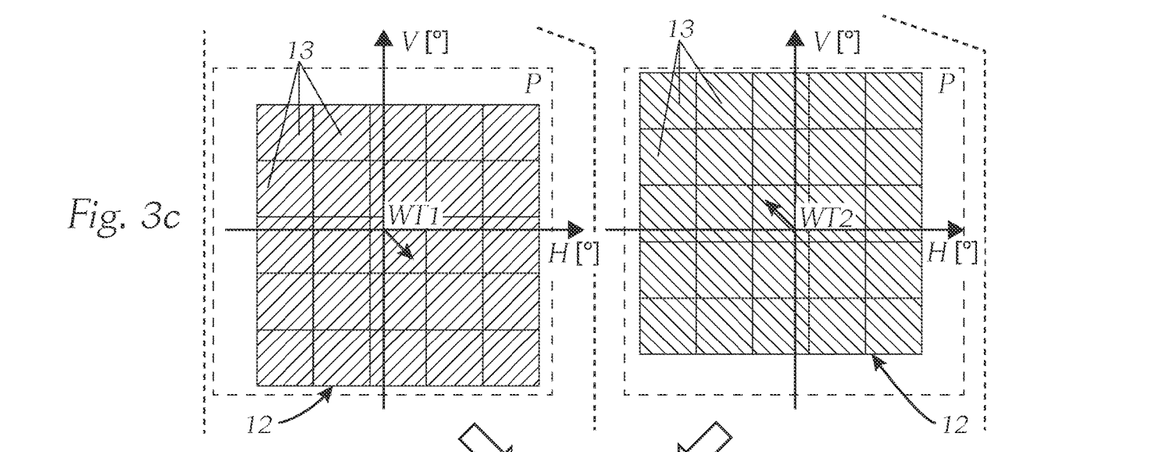

The illuminable area within the projection angular range P is expanded by displacing the projection 12 within the projection angular range P, as shown in FIG. 3c. Virtual light segments 13v of the projected spatially modulated light 11 can be created in particular with a sufficiently fast and oscillating displacement, further increasing the freedom in the adaptation of the projection 12 of the spatially modulated light 11. Sufficiently fast can be understood in this context to mean an oscillating displacement of at least 60 Hz. This option is described in more detail further below based on FIG. 3a to FIG. 3d.

Now, FIG. 1 further shows the control unit 40, which according to the invention is designed to receive and evaluate the input signal 43 and on the basis of this to transmit the light control signal 41 to the light source. The input signal 43 is now described in more detail based on FIG. 2a and FIG. 2b.

FIG. 2a shows an exemplary signal waveform of the input signal 43, which has a synchronization signal Sv with synchronization pulses Vs and temporally intermediate light data blocks 43a1, 43a2, 43aN. First deflection data 43b1 are contained in the first light data block 43a1, and second deflection data 43b2 are contained in the second light data block 43a2. Further deflection data 43bN can be contained in any further light data block 43aN. Each light data block 43a1, 43a2, 43aN typically comprises a binary data stream, wherein each binary data stream in its sum as a light data block, temporally between two synchronization pulses Vs, can describe the spatially modulated light 11 to be emitted by the light source 10 in successive time ranges T1, T2, Tn (see FIG. 3a). The input signal 43 thus comprises a first light data block 43a1 which is at least partially representative of the emitted spatially modulated light 11 of the light source 10 in a first time range T1. "At least partially" because a light data block 43a1, 43a2, 43aN can comprise further data, such as metadata. These further data can thus also contain the deflection data 43b1, 43b2, 43bN or at least the first deflection data 43b1. The input signal 43 can thus comprise, as shown, a combination of several signals, which can be collectively received by the control unit 40. It can also be seen that the first deflection data 43b1 are contained according to the invention in the first light data block 43a1. Since a light data block 43a1, 43a2, 43aN typically comprises a binary data stream, the deflection data 43b1, 43b2, 43bN also exist as binary data. These can thus describe a first displacement angle WT1 in the first light data block 43a1, with which the projection 12 of the spatially modulated light can be displaced in front of the light module 1 within the projection angular range P. For example, the deflection data 43b1, 43b2, 43bN exist as binary data, wherein a displacement angle of −2° can be represented with a bit value equal to 0, and a displacement angle of +2° can be represented with a bit value equal to 1. Asymmetrical displacement angles are also conceivable in relation to the neutral position of the projection 12 of the spatially modulated light 11. Furthermore, larger binary numbers are also possible if needed. For example, a binary value equal to 0011 represents a displacement angle of +1.5° and a binary value equal to 1010 represents a displacement angle of −1°.

Parts of the first light data block 43a1 are thus representative of the emitted spatially modulated light 11 of the light source 10 in a first time range T1. Furthermore, the first deflection data 43b1 contained in the first light data block 43a1 are representative of the first displacement angle WT1 in the same first time range T1, with which the projection 12 of the spatially modulated light 11 emitted by the light source 10 is displaced in front of the light module 1 within the projection angular range P in the first time range T1.

FIG. 2a is intended to show purely schematically that the respective deflection data 43b1, 43b2, 43bN are contained in the respective light data blocks 43a1, 43a2, 43aN. The representation shown of the respective deflection data 43b1, 43b2, 43bN in a certain section of the respective light data blocks 43a1, 43a2, 43aN is not limited to the variant shown. As explained in the following descriptions of the figures, the deflection data 43b1, 43b2, 43bN can also be regularly and redundantly integrated within the respective light data blocks 43a1, 43a2, 43aN.

The integration of the first deflection data 43b1 into the first light data block 43a1 will be explained in more detail later based on FIG. 2c.

Regardless of the way described in the introduction in which the spatially modulated light 11 or a plurality of light segments 13 is generated, such a spatially modulated light 11 is typically described using image data. The image data can be comprised of the binary data stream of the light data block 43a1, 43a2, 43aN described above, wherein the image data contain at least information about the intensity of each light segment 13. These image data can thus comprise intensity values I1, I2, In. The spatially modulated light 11 emitted by the light source 10 (or its projection 12) thus comprises a plurality of light segments 13, wherein the first light data block 43a1 comprises intensity values I1, I2, In, which intensity values I1, I2, In describe the light intensity of at least part of the plurality of light segments 13 in the first time range T1.

The intensity values I1, I2, In can respectively have a bit depth of 4 to 32 bits. The bit depth thus indicates the number of gradations with which the intensity of an individual light segment 13 of the projection 12 of the spatially modulated light 11 can be described. A bit depth of 8 bits therefore allows 2^8 different gradations in light intensity. This bit depth is preferably exactly 8 bits.

Figure 2B:
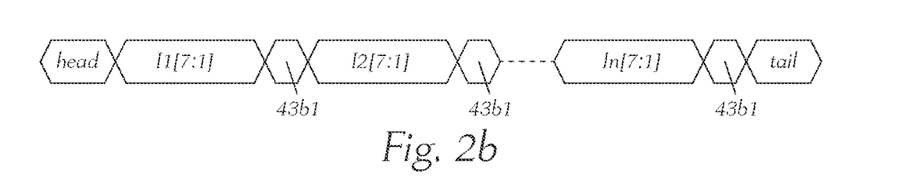

As shown in FIG. 2b, the first deflection data 43b1 can be integrated in at least one bit of this bit depth. This reduces the number of possible gradations for the light intensity of at least one individual light segment 13 of the spatially modulated light 11 in the first light data block 43a1, but the first deflection data 43b1 are thus connected to the first light data block 43a1 regardless of other influences, thus enabling robust and compact control of the light source 10 and the deflection unit 30 at the corresponding moment.

It is possible that only one intensity value I1 of the first light data block 43a1 is reduced in its bit depth such that the first deflection data 43b1 can be integrated in the corresponding first light data block 43a1 and are thus included. Preferably, all intensity values I1, I2, In are reduced in their bit depth such that each individual intensity value I1, I2, In of the first light data block 43a1 contains the first deflection data 43b1, which are representative of the first displacement angle W1 in the same first time range T1, with which the projection 12 of the spatially modulated light 11 emitted by the light source 10 is displaced in front of the light module 10 within the projection angular range P.

Figure 2C:
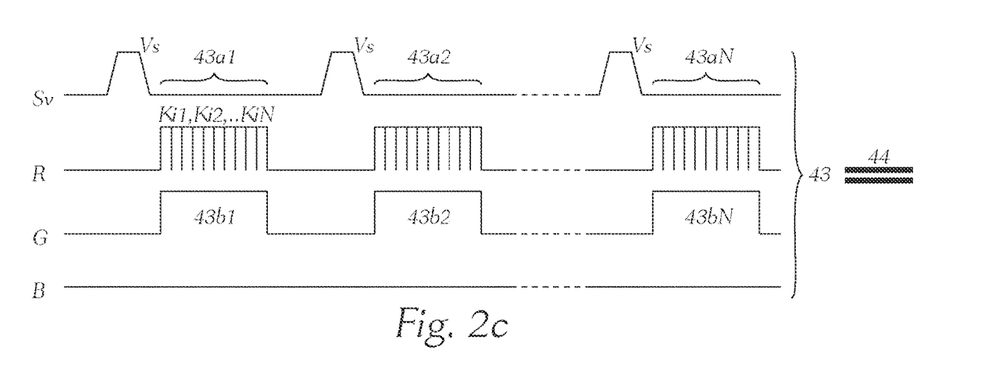

As shown in FIG. 2c, it can also be provided that the input signal 43 has a first light data block 43a1, which comprises a plurality of channels R, G, B. These channels R, G, B can be part of the image data described above, wherein each channel R, G, B can comprise a plurality of channel intensity values Ki1, Ki2, KiN or metadata, which channel intensity values Ki1, Ki2, KiN describe a colour intensity of at least part of the plurality of light segments 13. If a channel contains metadata, these can have properties of the respective light data block. Such a structure of a light data block can be provided on the basis of standardized interfaces, as is usual for video signal transmissions. As is usual with a light module for a motor vehicle, the projection 12 of the spatially modulated light 11 for illumination purposes can only comprise white light, which means that a single channel R, G, B with corresponding channel intensity values Ki1, Ki2, KiN is sufficient when using a corresponding light source 10. Advantageously, compact control of the light source 10 and the deflection unit 30 can thus be provided if the first light data block 43a1 has a plurality of channels R, G, B and at least one channel R, G, B contains the first deflection data 43b1. For example, one channel R has all of the first light data block 43a1, in particular all of the light data blocks 43a1, 43a2, 43aN of a plurality of consecutive light data blocks 43a1, 43a2, 43aN, and a second channel G has all of the first deflection data 43b1, in particular all of the deflection data 43b1, 43b2, 43bN contained in the light data blocks 43a1, 43a2, 43aN.

Now, FIG. 2c further shows that the input signal 43 can be transformed into a serial data string 44 by means of serialization for compact transmission, as is known. The number of physical connections (such as cables) to the control unit 40 can thus be greatly reduced. The input signal 43 has a synchronization signal Sv here, for example, with synchronization pulses Vs and temporally intermediate light data blocks 43a1, 43a2, 43aN, wherein the light data blocks 43a1, 43a2, 43aN respectively have three channels R, G, B. As described above, the first deflection data 43b1 can be integrated into a channel R, G, B either by reducing the bit depth of individual intensity values I1, I2, In or channel intensity values Ki1, Ki2, KiN or at least partially.

The input signal 43, in the form of a serial data string 44, can be received by the control unit 40, wherein the control unit 40 can recover the components of the input signal 43 by means of deserialization, for example.

Such serialization and deserialization is known in particular from data transmissions via LVDS or GMSL interfaces.

Details of the time ranges T1, T2, Tn, in particular details of the first time range T1, are discussed below based on FIG. 3a to FIG. 3d. Although this is now explained in more detail as part of the description of one embodiment, it should be clear that the following details also apply and are applicable to all other embodiments. FIG. 3a to FIG. 3c relate to the same time ranges T1, T2, Tn.

The first time range T1 is limited by a first start time T1s and a second start time T2s. The first start time Tis can be triggered, i.e. started, by the output of the first light control signal 41T1 by the control device 40 to the light source 10 or by the output of the first deflection control signal 42T1 by the control device 40 (or in one embodiment according to FIG. 5 by a light sensor 50) to the deflection unit 30. The first time range T1, preferably all time ranges T1, T2, Tn, can also be started by the synchronization pulses Vs contained in the synchronization signal Sv. Sequential output of the first light control signal 41T1 after the first deflection control signal 42T1 can be used to compensate for a possible time delay of an element, for example the deflection unit 30, due to mechanical inertia, wherein the projection 12 of the spatially modulated light 11 of the light source 10 can be manipulated precisely when the spatially modulated light 11 of the light source 10 is emitted in the first time range T1 and is thus displaced by the first displacement angle WT1 within the projection angular range P.

Similarly, the time range T1 can be ended by the output of a second deflection control signal 42T2 or by the output of a second light control signal 41T2. At the same time, the second time range T2 can be started by the output of a second deflection control signal 42T2 or by the output of a second light control signal 41T2.

Even if the emission of the spatially modulated light 11 and the manipulation of the same spatially modulated light 11 are preferably triggered at the same time in the first time range T1, it is not excluded that the emission of the spatially modulated light 11 and the manipulation of the same spatially modulated light 11 are triggered at different times within the first time range T1. This may even be desirable in some cases, such as for creating certain light effects.

Contiguous time ranges T1, T2, Tn are now shown in FIG. 3a. Each time range T1, T2, Tn is started or ended in this exemplary sequence by the output of the respective deflection control signal 42T1, 42T2, 42Tn by the control unit 40 to the deflection unit 30, wherein the light source 10 emits a spatially modulated light 11 as a function of the light control signal 41T1, 41T2, 41Tn in the respective time range T1, T2. It is understood that the light control signal 41T1, 41T2, 41Tn in the respective time range T1, T2, Tn is thus related to that light data block 43a1, 43a2, 43aN which is at least partially representative of the emitted spatially modulated light 11 of the light source 10 in the respective time range T1, T2, Tn. The same applies to the deflection data 43b1, 43b2, 43bN contained in the respective light data block 43a1, 43a2, 43aN and the deflection control signals 42T1, 42T2, 42Tn derived therefrom.

FIG. 3b now schematically shows the relationship between the respective light control signal 41T1, 41T2, 41Tn and the respective deflection control signal 42T1, 42T2, 42Tn in the respective time range T1, T2, Tn.

In the first time range T1, spatially modulated light 11 is emitted as a function of the first light control signal 41T1 and the same emitted spatially modulated light is correspondingly manipulated in the first time range T1 as a function of the first deflection control signal 42T1, by pivoting the glass plate 31 contained in the deflection unit 30, such that the projection 12 of the spatially modulated light 11 of the light source 10 is displaced by the first displacement angle WT1 within the projection angular range P when the spatially modulated light 11 of the light source 10 is emitted in the first time range T1 as a function of the first light control signal 41T1. The displaced projection 12 in the first time range T1 is shown in FIG. 3c.

The spatially modulated light 11 of the light source 10 or its projection 12 preferably only comprises similar square light segments 13. The projection 12 of the spatially modulated light 11 of the light source 10 is preferably displaced within the projection angular range P with a displacement angle in a direction 450 to a side angle of the square light segments 13. If the displacement angle is (side angle*sgrt (2))/2 and the displacement is sufficiently fast and oscillating over a plurality of time ranges T1, T2, Tn, the number of virtual light segments 13v is approximately four times the native number of light segments 13 due to overlapping.

In the present case, the light source 10 produces a spatially modulated light 11, which has 25 light segments 13 in 5 rows and 5 columns. The projection 12 of this spatially modulated light 11 is shown in the respective time ranges T1 and T2 in FIG. 3c. The overlapping described above now results in, as shown in FIG. 3d, 9 rows and 9 columns with virtual light segments 13v within the projection angular range P.

In the second time range T2, spatially modulated light 11 is emitted as a function of the second light control signal 41T2 and the same emitted spatially modulated light 11 is correspondingly manipulated in the second time range T2 as a function of the second deflection control signal 42T1, by pivoting the glass plate 31 contained in the deflection unit 30, such that the projection 12 of the spatially modulated light 11 of the light source 10 is displaced by the second displacement angle WT2 when the spatially modulated light 11 of the light source 10 is emitted in the second time range T2 as a function of the second light control signal 41T2. The displaced projection 12 within the projection angular range P in the second time range T2 is shown in FIG. 3c.

The first displacement angle WT1 and the second displacement angle WT2 preferably differ in that they respectively point symmetrically in opposite directions measured at a neutral position of the deflection unit 30, which substantially leads to no manipulation of the emitted spatially modulated light (displacement angle is accordingly 0°). For example, WT1 is equal to −2° and WT2 is equal to +2°.

Accordingly, the control unit 40 can receive an input signal 43 with a plurality of consecutive light data blocks 43a1, 43a2, 43aN. This plurality of consecutive light data blocks 43a1, 43a2, 43aN respectively comprise deflection data 43b1, 43b2, 43bN, resulting in a plurality of consecutive time ranges T1, T2, Tn, in which each of the individual light data blocks 43a1, 43a2, 43aN each having deflection data 43b1, 43b2, 43bN is representative of the emitted spatially modulated light 11 of the light source 10 and of the displacement angle W within a respective time range T1, T2, Tn, wherein the duration of the respective timer ranges T1, T2, Tn is substantially the same and is between 5 ms and 50 ms. With such a rapid variation of the emitted spatially modulated light 11 and the displacement angle W over the plurality of consecutive time ranges T1, T2, Tn, virtual light segments 13v can be created in overlap. This can therefore give the human eye the impression that the number of light segments of the projected spatially modulated light 11 is increased compared to the number of light segments 13 of the projected spatially modulated light 11 within an individual time range. Such overlapping is shown schematically in FIG. 3d.

Figure 3D:
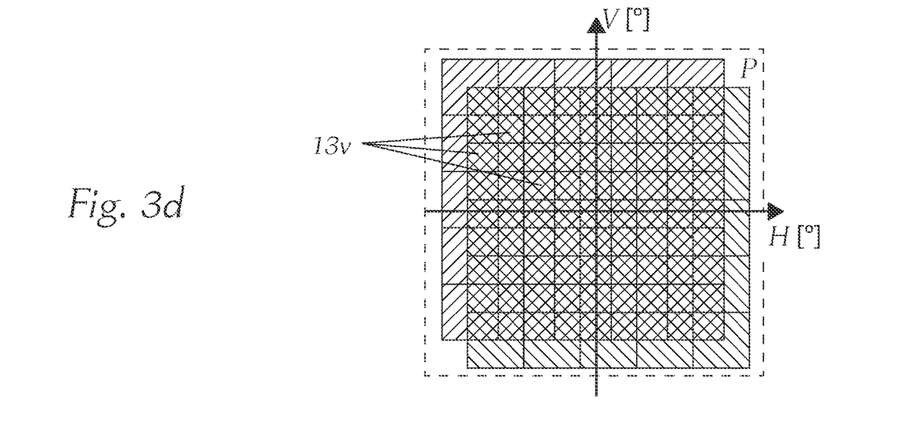

The input signal 43 can be provided by a superordinate control unit 140. The superordinate control unit 140 can be designed to form at least the first light data block 43a1 and the second light data block 43a2 each having deflection data 43b1, 43b2 from a setpoint image and to provide these via the input signal 43. The resulting overlap as shown in FIG. 3d can correspond substantially to the setpoint image. This means that the overlap is at least more similar to the setpoint image than the setpoint image compared to one of the two resulting projections 12 in the respective time range T1, T2. The superordinate control unit 140 can be designed to form a plurality of consecutive light data blocks 43a1, 43a2, 43aN from a plurality of setpoint images, wherein at least two consecutive light blocks 43a1, 43a2 having deflection data 43b1, 43b3 are formed from each setpoint image.

In order to minimize the control effort during operation and still create a plurality of virtual light segments 13v, each n-th light data block of the plurality of consecutive light data blocks 43a1, 43a2, 43aN preferably has deflection data 43b1, 43b2, 43bN, which are equal to each other, wherein n is a natural number greater than 1. This means that the displacement angle WT1, WT2, WTn represented by the deflection data that are equal to each other is the same. Particularly preferably, n is equal to 2, which means that all second deflection data are equal, which means that every second displacement angle is equal. Very particularly preferably, all directly consecutive light blocks 43*a*1, 43*a*2, 43*a*N have different deflection data 43*b*1, 43*b*2, 43*b*N, wherein, however, only two different deflection data are preferably contained in the plurality of consecutive light data blocks 43*a*1, 43*a*2, 43*a*N. Accordingly, the first light data block 43*a*1 would contain first deflection data 43*b*1 and the subsequent second light data block 43*a*2 would contain second deflection data 43*b*2 and the subsequent light data block would again contain the first deflection data 43*b*1 and so on. Both the deflection data 43*b*1, 43*b*2, 43*b*N and the number n can be changed during operation if necessary. One possible deflection data rate of change can be 2 changes per minute. Thus, the plurality of consecutive light data blocks 43*a*1, 43*a*2, 43*a*N means at least a limited series of consecutive light data blocks 43*a*1, 43*a*2, 43*a*N.

Figure 4:
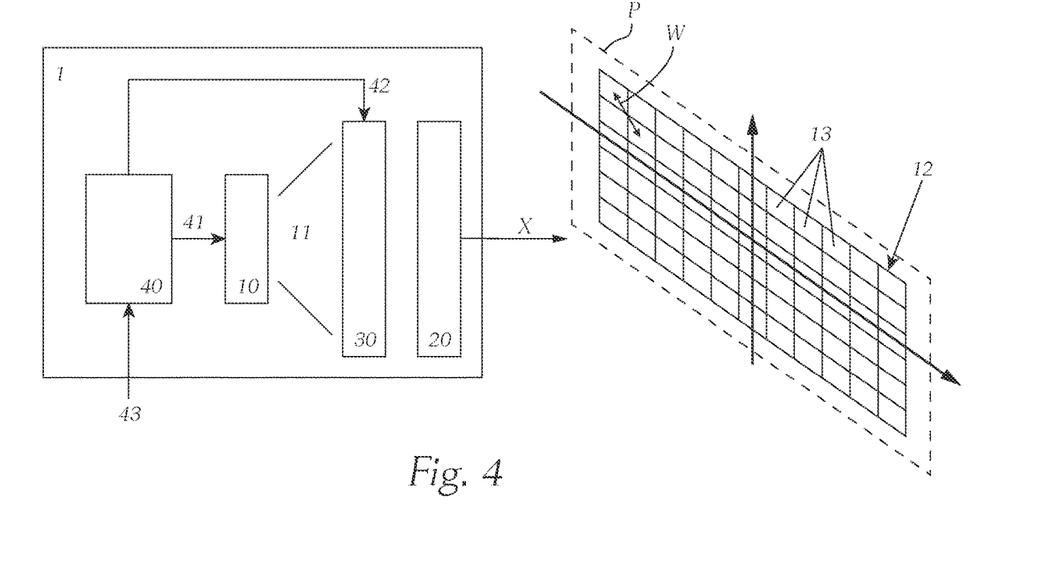
FIG. 4 shows a first embodiment of the light module.

One embodiment of the light module 1 is now discussed based on FIG. 4. In this embodiment, the light module 1 in accordance with FIG. 1 comprises a light source 10, a projection unit 20, a deflection unit 30, as well as a control unit 40. The control unit 40 is connected to the light source 10 by means of signals and designed to output the light control signal 41T1, 41T2, 41Tn to the light source 10 within the respective time ranges T1, T2, Tn, wherein the light source 10 is designed to receive the light control signal 41T1, 41T2, 41Tn and to emit spatially modulated light 11 in the respective time range T1, T2, Tn as a function of the light control signal 41T1, 41T2, 41Tn.

Furthermore, in this embodiment, the control unit 40 is connected to the deflection unit 30 by means of signals and is designed to output the deflection control signal 42T1, 42T2, 42Tn to the deflection unit 30 within the respective time ranges T1, T2, Tn, wherein the deflection unit 30 is designed to receive the deflection control signal 42T1, 42T2, 42Tn and to manipulate the spatially modulated light 11 emitted by the light source 10 as a function of the deflection control signal 42T1, 42T2 42Tn such that the projection of the spatially modulated light emitted by the light source can be displaced in front of the light module 1 with a displacement angle WT1, WT2 within the projection angular range P within the respective time ranges T1, T2, Tn.

In this embodiment, the control unit 40 is designed to extract a first light control signal 41T1 and a first deflection control signal 42T1 from the first light data block 43*a*1 from the input signal 43 and to output the first deflection control signal 42T1 in the first time range T1 to the deflection unit 30 and the first light control signal 41T1 in the first time range T1 to the light source 10 such that the projection 12 of the spatially modulated light 11 of the light source 10 is displaced by the first displacement angle WT1 in the first time range T1 as soon as the spatially modulated light 11 is emitted by the light source 10 in the first time range T1. As already described in the explanation on the time ranges based on FIG. 3*a* to FIG. 3*d*, the first time range T1 is preferably started by the output of the first light control signal 41T1 by the control device 40 to the light source 10 or by the output of the first deflection control signal 42T1 by the control device 40 to the deflection unit 30.

Figure 5:
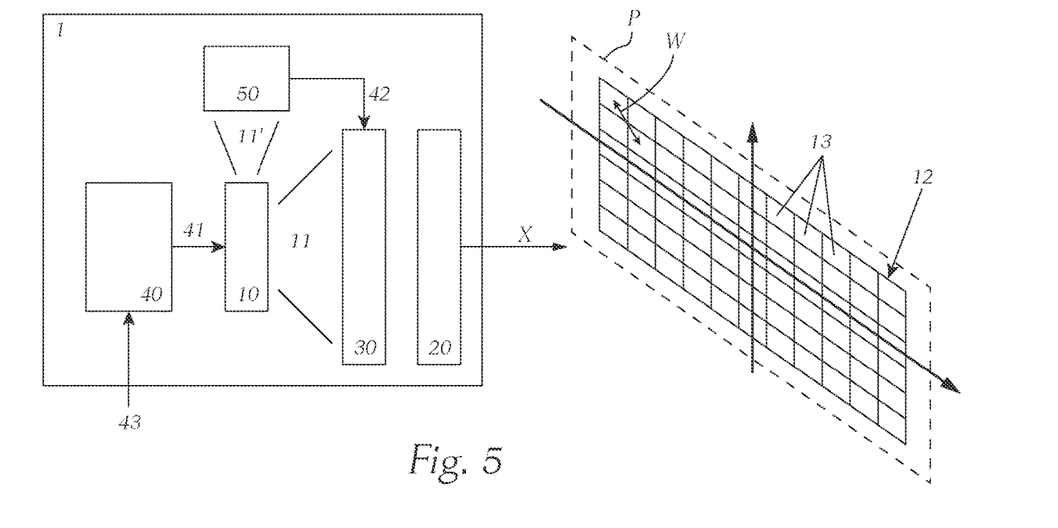
FIG. 5 shows a second embodiment of the light module.

FIG. 5 shows another embodiment. In this embodiment, the light module 1 also comprises a light source 10, a projection unit 20, a deflection unit 30, as well as a control unit 40. The control unit 40 is connected to the light source 10 by means of signals and designed to output the light control signal 41T1, 41T2, 41Tn to the light source 10 within the respective time ranges T1, T2, Tn, wherein the light source 10 is designed to receive the light control signal 41T1, 41T2, 41Tn and to emit spatially modulated light 11 within the respective time ranges T1, T2, Tn as a function of the light control signal 41T1, 41T2, 41Tn.

Furthermore, it is provided in this advantageous embodiment that the control unit 40 extracts a first light control signal 41T1 and the first deflection data 43*b*1 from the first light data block 43*a*1 and can then integrate the first deflection data 43*b*T1 into the first light control signal 41T1 in such a way that part 11' of the emitted spatially modulated light 11 in the first time range T1 contains information about the first displacement angle WT1 in the same first time range T1. The part 11' of the emitted spatially modulated light 11 can thus comprise a light segment 12, which, isolated from the remaining light segments of the spatially modulated light 11, is not projected via the projection unit 20 in front of the light module (even if a manipulation of the spatially modulated light 11 occurs). The part 11' of the spatially modulated light 11 is only shown schematically in FIG. 5 and is emitted from the side of the light source 10. In order to achieve lateral emission of this kind, a deflection mirror (not shown in FIG. 5) can, for example, laterally deflect part 11' of the spatially modulated light 11.

Extraction and subsequent integration also comprises the possibility that the first light data block 43*a*1 already directly describes (without interface-specific adjustments) the spatially modulated light 11 of the light source 10 in the first time range T1 and the first deflection data 43*b*1 already directly describe part 11' of the spatially modulated light 11 of the light source 10 in the first time range T1. This can be the case when the deflection data 43*b*1, 43*b*2, 43*b*N are integrated into the respective light data blocks 43*a*1, 43*a*2, 43*a*N according to the embodiments shown in FIG. 2*a*, 2*b* or 2*c*, for example. In this case, the control unit 40 provides the first light control signal 41T1 for the light source 10 based on direct transmission of the first light data block 43*a*1 to the light source 10.

Furthermore, a light sensor 50 is provided in this embodiment, which is designed to pick up the one part 11' of the emitted spatially modulated light 11 of the light source 10, which contains information about the first displacement angle WT1 in the first time range T1 and to output a first deflection control signal 42T1 based thereon to the deflection unit 30 such that the projection 12 of the spatially modulated light 11 of the light source 10 is displaced by the first displacement angle WT1 within the projection angular range P in the first time range T1 as soon as the spatially modulated light 11 is emitted by the light source 10 in the first time range T1.

The light sensor can preferably comprise a photodiode (not shown).

In this embodiment, the deflection unit 30 can be made independent of the rest of the light module 1 in terms of the electronic interfaces in conjunction with the light sensor 50.

The invention also relates to a motor vehicle 100 (shown in FIG. 6) having a light module 1 and further a motor vehicle 100, which has at least one second light module 1A, which is identical to the first light module 1, wherein the control unit 40A of the second light module 1A receives the same input signal 43 as the control unit 40 of the first light module 1 and the first light data block 43*a*1 further comprises an identification, which can be clearly assigned to the first light module 1 or to the second light module 1A. The second light module 1A can extend the projection 12 of the first light module 1 across the projection angular range P. In the essence of the invention, a light image to be generated can thus be given further freedom in its adaptation, wherein a scalability of the overall illumination device of a motor vehicle 100 is achieved without substantially increasing the complexity of the control. The input signal 43 can, as shown in FIG. 6, be provided by a superordinate control device 140.

Figure 7:
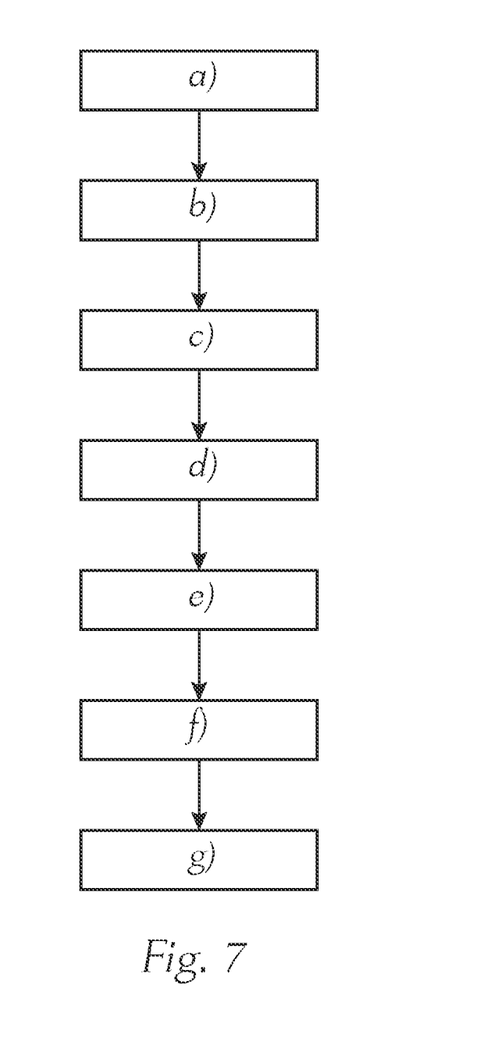
FIG. 7 shows a method for operating the light module described in FIG. 1.

FIG. 7 now shows a method for operating the light module 1 described in FIG. 1, wherein in a first step a) the first light data block 43*a*1 is provided, which is at least partially representative of the emitted spatially modulated light 11 of the light source 10 in a first time range T1.

Figure 6:
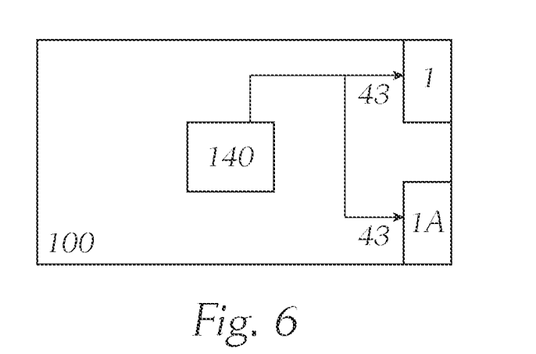
FIG. 6 shows a motor vehicle.

The superordinate control device 140 shown in FIG. 6 can provide this first light data block 43*a*1 via the input signal 43, wherein the basis of the first light data block 43*a*1 provided can, for example, be requirements from the vehicle. These requirements from the vehicle can comprise specific light distributions, in which stored static light distributions, such as full beam distributions, can be combined with masking information such that a light data block 43*a*1, 43*a*2, 43*a*N is produced, which is at least partially representative of a spatially modulated light in the respective time range T1, T2, Tn. In this case, the light data blocks 43*a*1, 43*a*2, 43*a*N are thus representative of spatially modulated light in the respective time ranges T1, T2, Tn of a masking scenario.

In step b) shown, first deflection data 43*b*1 are provided, which are representative of the first displacement angle WT1 in the same first time range T1.

These first deflection data 43*b*1 can be provided by the same superordinate control device 140, wherein the basis of the provided first deflection data 43*b*1 are further requirements from the vehicle. The further requirements from the vehicle can comprise a displacement of the projection 12 of the spatially modulated light 11 of the light source 10 by a specific first displacement angle WT1.

In step c), the first deflection data 43*b*1 are integrated into the first light data block 43*a*1.

The first deflection data 43*b*1 can also be integrated by the same superordinate control device 140 into the first light data block 43*a*1. Integration can occur, for example, according to the embodiment shown in FIG. 2*b* by reducing the bit depth of the intensity values I1, I2, In or according to the embodiment shown in FIG. 2*c*, by at least partially utilizing a channel R, G, B of the first light data block 43*a*1, in particular of every light data block 43*a*1, 43*a*2, 43*a*N.

The first light data block 43*a*1 together with the integrated first deflection data 43*b*1 can then be transformed into a serial data string 44 by means of serialization (according to the description of FIG. 2*c*). Subsequently, in step d), the first light data block 43*a*1 together with the integrated first deflection data 43*b*1 are then transmitted via the input signal 43 to the control unit 40.

In a further step e), the control unit 40 evaluates the input signal 43. The evaluation can comprise deserialization of the input signal 43 in the present case. Furthermore, the evaluation can also comprise extracting the first light control signal 41T1 from the first light data block 43*a*1. This can be achieved by means of preset filtering.

In step e), according to the embodiment of the light module 1 shown in FIG. 4, the first deflection control signal 42T1 can further also be extracted from the first light data block 43*a*1.

According to the alternative embodiment of the light module 1 according to FIG. 5, in step e) the control unit 40 can extract the first light control signal 41T1 and the first deflection data 43*b*1 from the first light data block 43*a*1 and before step f) the control unit 40 can integrate the first deflection data 43*b*1 into the first light control signal 41T1 in such a way that part 11' of the emitted spatially modulated light 11 of the light source 10 in the first time range T1 contains information about the first displacement angle WT1 in the same first time range T1. A possible way for the control unit 40 to integrate the deflection data 43*b*1 into the first light control signal 41T1 has already been described based on FIG. 5.

In the next step f), the first light control signal 41T1 is provided according to the first light data block 43*a*1 for the light source 10 in the first time range T1.

In particular, the control unit 40 can output the first light control signal 41T1 to the light source 10 in the first time range T1 or provide it to the light source 10.

Although the first light control signal 41T1 is provided in the first time range T1, this does not exclude the possibility that the first time range, as described in FIG. 3*a*, is also started by the output of the first light control signal 41T1 by the control device 40.

In the final step g), the first deflection control signal 42T1 is now provided to the deflection unit 30 in the same first time range T1 in accordance with the first deflection data 43*b*1 integrated in the first light data block 43*a*1.

According to the embodiment of the light module according to FIG. 4, in step g) the control unit 40 can output the first deflection control signal 42T1 in the first time range T1 to the deflection unit 30 such that the projection 12 of the spatially modulated light of the light source 10 is displaced by the first displacement angle WT1 within the projection angular range P in the first time range T1 as soon as the spatially modulated light 11 is emitted by the light source 10 in the first time range T1.

According to the alternative embodiment of the light module according to FIG. 5, the light module has the light sensor 50 which before step g) can pick up the at least one part 11' of the emitted spatially modulated light 11 of the light source 10 in the first time range T1 in order then in step g) to output a first deflection control signal 42T1 based thereon to the deflection unit 30 in the first time range T1 such that the projection 12 of the spatially modulated light 11 of the light source 10 is displaced by the first displacement angle WT1 within the projection angular range P in the first time range T1 as soon as the spatially modulated light 11 is emitted by the light source 10 in the first time range T1.

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

The invention claimed is:

1. A light module (1) for a motor vehicle light comprising a light source (10), a projection unit (20), a deflection unit (30), as well as a control unit (40), wherein the light source (10) is designed to receive a light control signal (41) and to emit spatially modulated light (11) as a function of the light control signal (41), wherein the projection unit (20) is designed to project the spatially modulated light (11) emitted by the light source (10) within a projection angular range (P) in front of the light module (1), wherein the deflection unit (30) is designed to receive a deflection control signal (42) and to manipulate the spatially modulated light (11) emitted by the light source (10) as a function of the deflection control signal (42) such that the projection (12) of the spatially modulated light emitted by the light source can be displaced in front of the light module (1) with a displacement angle (W) within the projection angular range (P), wherein the control unit (40) is designed to receive and evaluate an input signal (43) and on the basis of this to transmit the light control signal (41) to the light source (10), and wherein the input signal (43) comprises a first light data block (43*a*1), which is at least partially representative of the emitted spatially modulated light from the light source (10) in a first time range (T1) and first deflection data (43*b*1) are contained in this first light data block, which are representative of a first displacement angle (WT1) in the same first time range (T1).

2. The light module according to claim 1, wherein the control unit (40) is designed to extract a first light control signal (41T1) and a first deflection control signal (42T1) from the first light data block (43*a*1) from the input signal (43) and to output the first deflection control signal (42T1) in the first time range (T1) to the deflection unit (30) and the first light control signal (41T1) in the first time range (T1) to the light source (10) such that the projection (12) of the spatially modulated light of the light source (10) is displaced by a first displacement angle (WT1) in the first time range (T1) as soon as the spatially modulated light (11) is emitted by the light source (10) in the first time range (T1).

3. The light module according to claim 1, wherein the control unit is designed to extract a first light control signal (41T1) and the first deflection data (43*b*1) from the first light data block (43*a*1) and to integrate the first deflection data (43*b*1) into the first light control signal (41T1) in such a way that part (11') of the emitted spatially modulated light (11) in the first time range (T1) contains information about the first displacement angle (WT1) in the same first time range (T1), wherein the light module (1) further has a light sensor (50) which is designed to pick up the one part (11') of the emitted spatially modulated light of the light source (10), which contains information about the first displacement angle (WT1) in the first time range (T1) and to output a first deflection control signal (42T1) based thereon to the deflection unit (30) such that the projection (12) of the spatially modulated light of the light source (10) is displaced by the first displacement angle (WT1) in the first time range (T1) as soon as the spatially modulated light (11) is emitted by the light source (10) in the first time range (T1).

4. The light module according to claim 1, wherein the input signal (43) comprises a plurality of consecutive light data blocks (43*a*1, 43*a*2, 43*a*N) each having deflection data (43*b*1, 43*b*2, 43*b*N), thereby describing a plurality of consecutive time ranges (T1, T2, Tn), in which each of the individual light data blocks (43*a*1, 43*a*2, 43*a*N) each having deflection data (43*b*1, 43*b*2, 43*b*N) is representative of the emitted spatially modulated light of the light source and of the displacement angle (WT1, WT2, WTn) in the respective time range (T1, T2, Tn), wherein the duration of the respective timer ranges (T1, T2, Tn) is substantially the same and is between 5 ms and 50 ms.

5. The light module according to claim 4, wherein each n-th light data block of the plurality of consecutive light data blocks (43*a*1, 43*a*2, 43*a*N) contains deflection data, which are equal to each other and n is a natural number greater than 1.

6. The light module according to claim 1, wherein the input signal (43) is provided by a superordinate control unit (140), wherein the superordinate control unit (140) is designed to form at least the first light data block (43*a*1) and the second light data block (43*a*2) each having deflection data (43*b*1, 43*b*3) from a setpoint image such that the projection (12) of the emitted spatially modulated light (11) of the light source (10) of the first time range (T1) overlapping with the projection (12) of the emitted spatially modulated light (11) of the light source (10) of the second time range (T2) substantially produces the setpoint image.

7. The light module according to claim 1, wherein the spatially modulated light (11) emitted by the light source (10) comprises a plurality of light segments (13) and the first light data block comprises intensity values (I1, I2, In), which describe the light intensity of at least some of the plurality of light segments (13) in the first time range (T1).

8. The light module according to claim 7, wherein the intensity values (I1, I2, In) respectively have a bit depth of 4 to 32 bits and the first deflection data (43*b*1) are integrated in at least one bit of this bit depth.

9. The light module according to claim 7, wherein the first light data block has a plurality of channels (Vs, R, G, B) and at least one channel (Vs, R, G, B) contains the first deflection data (43*b*1).

10. A motor vehicle having a light module according to claim 1.

11. The motor vehicle according to claim 10, wherein the motor vehicle has at least one second light module, which is identical to the first light module (1) and the control unit of the second light module receives the same input signal (43) as the control unit (40) of the first light module (1) and the first light data block (43*a*1) further comprises an identification, which can be clearly assigned to the first light module (1) or to the second light module.

12. A method for operating a light module (1) for a motor vehicle light, wherein the light module comprises a light source (10), a projection unit (20), a deflection unit (30), as well as a control unit (40), wherein the light source (10) is designed to receive a light control signal (41) and to emit spatially modulated light (11) as a function of the light control signal (41), wherein the projection unit (20) is designed to project the spatially modulated light (11) emitted by the light source (10) within a projection angular range (P) in front of the light module (1), wherein the deflection unit (30) is designed to receive a deflection control signal (42) and to manipulate the spatially modulated light (11) emitted by the light source (10) as a function of the deflection control signal (42) such that the projection (12) of the spatially modulated light emitted by the light source can be displaced in front of the light module with a displacement angle (W) within the projection angular range (P), wherein the method comprises:

a) providing a first light data block (43*a*1) which is at least partially representative of the emitted spatially modulated light of the light source (10) in a first time range (T1), b) providing first deflection data (43*b*1) which are representative of a first displacement angle (WT1) in the same first time range (T1), c) integrating the first deflection data (43*b*1) into the first light data block (43*a*1), d) transmitting the first light data block (43*a*1) together with the integrated first deflection data (43*b*1) via an input signal (43) to the control unit (40), e) evaluation of the input signal (43) by the control unit (40), f) providing a first light control signal (41T1) to the light source (10) in the first time range (T1) according to the first light data block (43*a*1), and g) providing a first deflection control signal (42T1) to the deflection unit (30) in the same first time range (T1) according to the first deflection data (43b1) integrated in the first light data block (43a1).

13. The method according to claim 12, wherein in step e) the control unit (40) extracts a first light control signal (41T1) and a first deflection control signal (42T1) from the first light data block (43a1) and in step f) the control unit (40) outputs the first light control signal (41T1) in the first time range (T1) to the light source (10) and in step g) the control unit (40) outputs the first deflection control signal (42T1) in the same first time range (T1) to the deflection unit (30) such that the projection (12) of the spatially modulated light of the light source (10) is displaced by the first displacement angle (WT1) in the first time range (T1) as soon as the spatially modulated light (11) is emitted by the light source (10) in the first time range (T1).

14. The method according to claim 12, wherein in step e) the control unit (40) extracts the first light control signal (41T1) and the first deflection data (43b1) from the first light data block (43a1) and before step f) the control unit (40) integrates the first deflection data (43b1) into the first light control signal (41T1) in such a way that part (11') of the emitted spatially modulated light (11) in the first time range (T1) contains information about the first displacement angle (WT1) in the same first time range (T1), wherein the light module (1) further has a light sensor (50) which is designed before step g) to pick up the at least one part (11') of the emitted spatially modulated light (11) of the light source (10) in the first time range (T1) in order then in step g) to output a first deflection control signal (42T1) based thereon to the deflection unit (30) in the first time range (T1) such that the projection (12) of the spatially modulated light (11) of the light source (10) is displaced by the first displacement angle (WT1) in the first time range (T1) as soon as the spatially modulated light (11) is emitted by the light source (10) in the first time range (T1).

* * * * *